May 5, 1931.　　　　J. RAH　　　　1,803,653
SYSTEM OF ELECTRICAL DISTRIBUTION
Filed March 21, 1927　　4 Sheets-Sheet 3
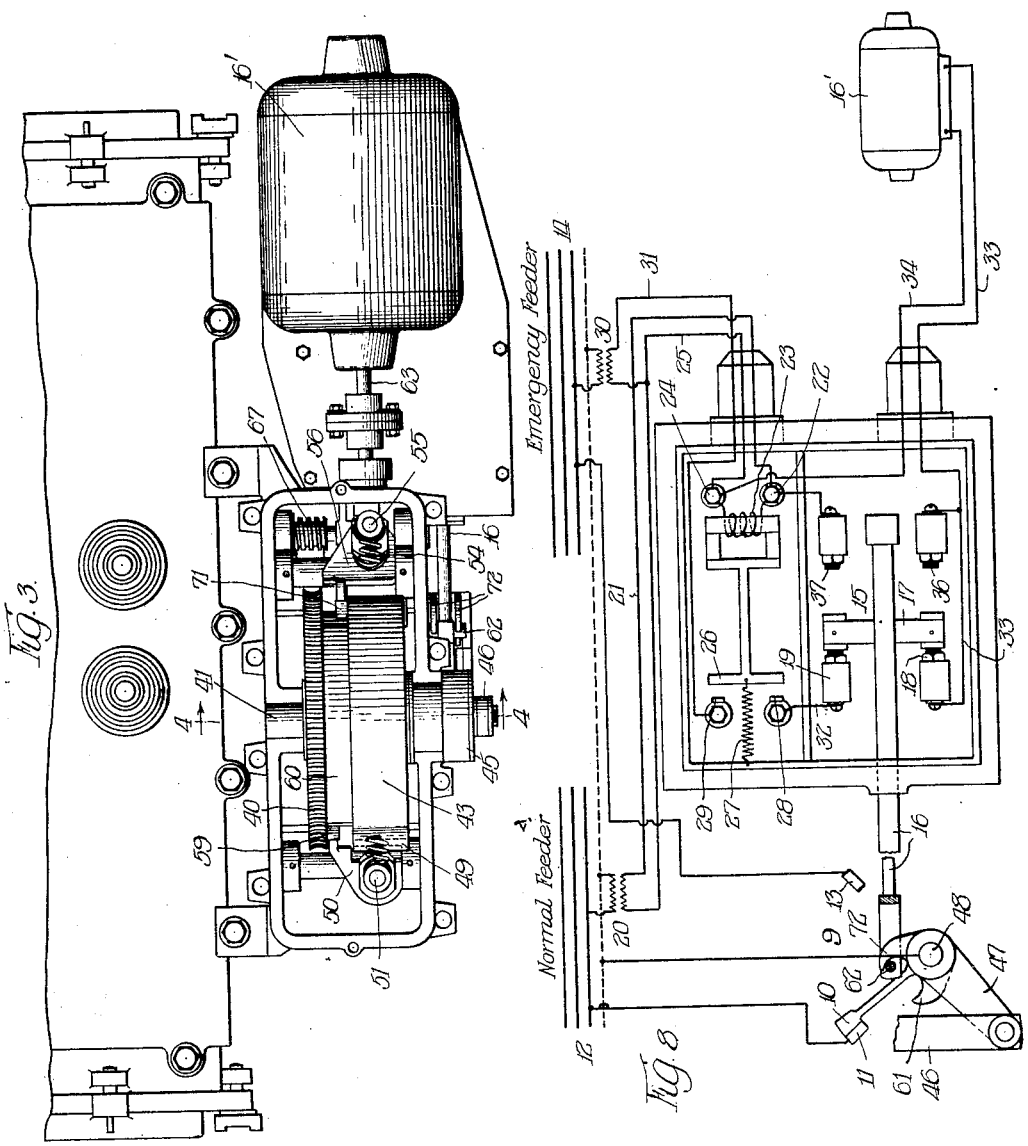

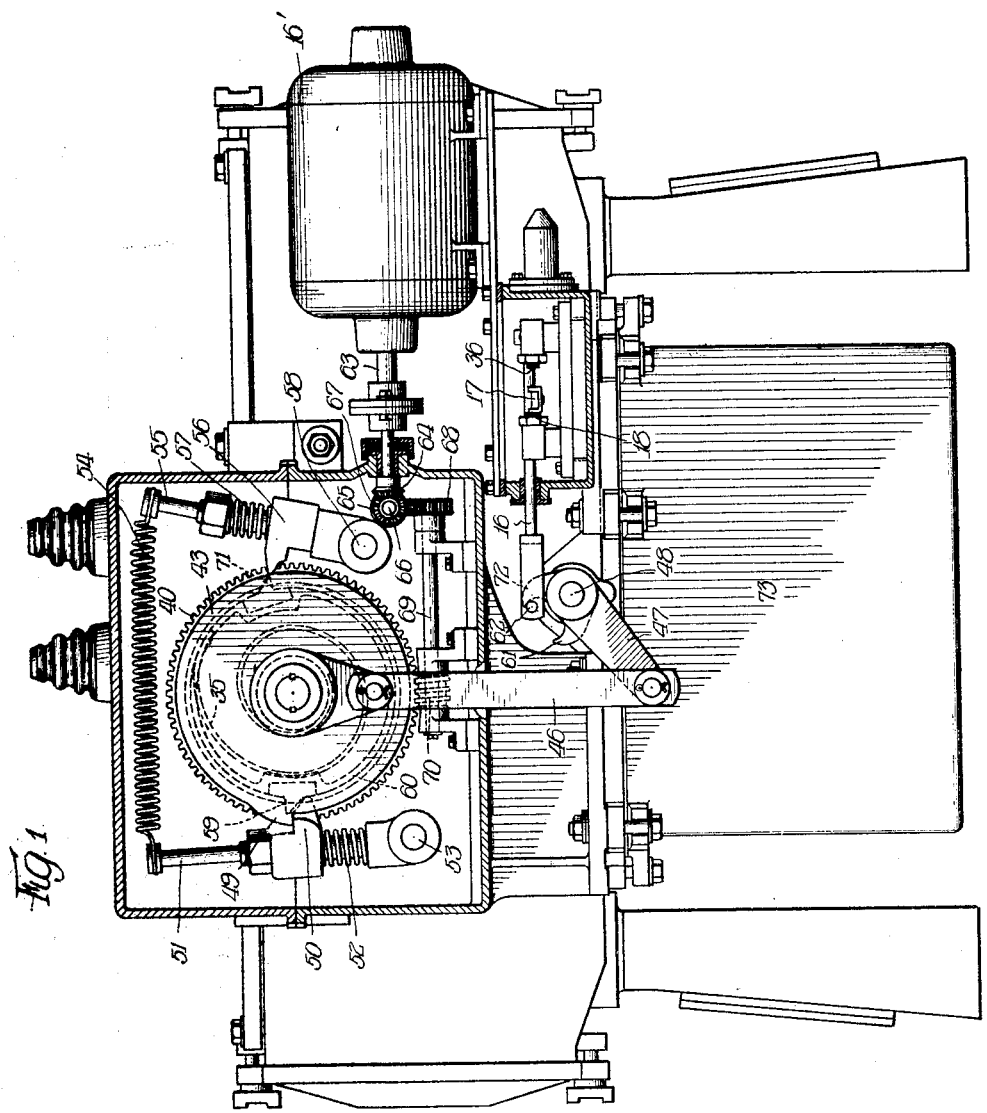

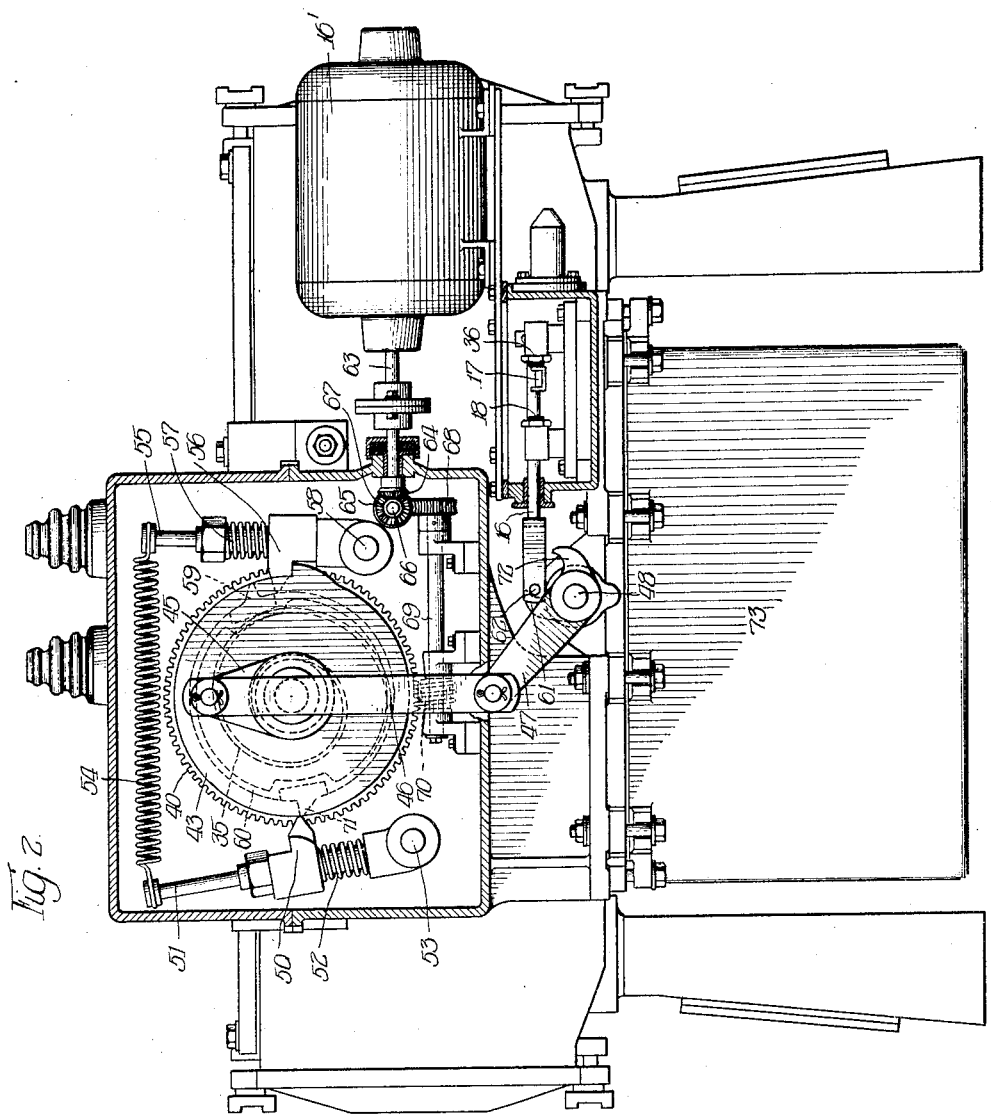

May 5, 1931.  J. RAH  1,803,653
SYSTEM OF ELECTRICAL DISTRIBUTION
Filed March 21, 1927  4 Sheets-Sheet 4
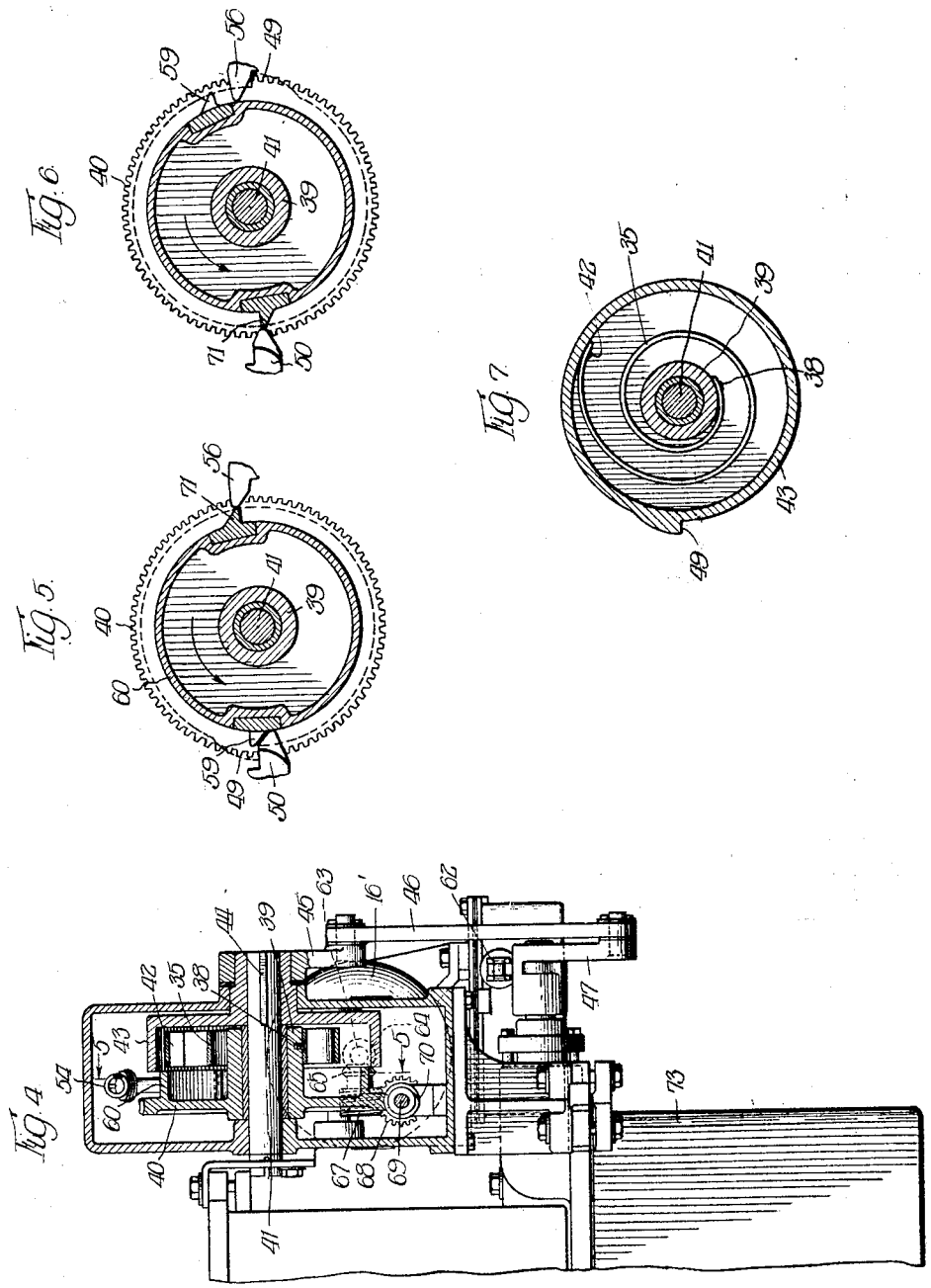
Witness:
A. Burkhardt
Inventor:
Joseph Rah,
By Wilkinson, Huxley, Byron & Knight
Attys.

Patented May 5, 1931

1,803,653

UNITED STATES PATENT OFFICE

JOSEPH RAH, OF CHICAGO, ILLINOIS, ASSIGNOR, BY MESNE ASSIGNMENTS, TO G. AND W. ELECTRIC SPECIALTY COMPANY, OF CHICAGO, ILLINOIS, A CORPORATION OF ILLINOIS

SYSTEM OF ELECTRICAL DISTRIBUTION

Application filed March 21, 1927. Serial No. 177,021.

This invention relates to a system of electrical distribution, and more particularly to means for controlling circuit connections in such a system.

In the application of Paul F. Williams, Serial No. 11,717, filed February 26, 1925, among other things there is disclosed a system of electrical distribution including a main control or service switch whereby the service load may be transferred from the normal feeder to the auxiliary feeder and from the latter to the former. The service switch, however, is operated manually. While the system may be operated under these circumstances, it will be appreciated that when the load is in the nature of motors for driving oil burners, refrigerators, etc., if the service switch is not thrown over promptly upon the occurrence of trouble on a feeder, all of said load motors will be brought to a stop and accordingly, when the switch is thrown over some minutes later, a full capacity load will be thrown onto the service system all at once. This is objectionable because it may not only blow main line fuses but it will result in an unbalanced condition of the feeders. For example, if there are three service or load units connected to the feeder or supply line and a load is thrown on suddenly in connection with one of said units, such will be noticeable in the other two units, as by the dimming of lights and the supply of a smaller amount of current to the motors on said two circuits. Therefore, it is important that the main or service switch be thrown promptly and automatically upon the occurrence of trouble along the feeder.

One object of the invention is to provide an arrangement whereby the main control or service switch in such a system of electrical distribution will be thrown automatically from one feeder to another if trouble occurs along the first feeder.

Another object is to provide an arrangement whereby said service switch may be thrown back from an auxiliary feeder to the normal feeder when conditions have been rectified on the normal feeder.

Another object is to provide a system of electrical distribution wherein a service switch may be quickly and automatically thrown from connection with one feeder to connection to a second feeder if trouble occurs along the first feeder and for preventing said switch from being thrown back into connection with said first feeder until after a certain predetermined time has elapsed.

Another object is to provide switch control mechanism for a system of electrical distribution in which the parts cooperate in a manner to meet all of the requirements under service conditions.

These and other objects are accomplished by means of the arrangement disclosed by the accompanying sheets of drawings, in which—

Figure 1 is a vertical sectional view of switch control mechanism for a system of electrical distribution including a service switch mounted in the main switch casing shown in elevation, the control parts being in the position which they occupy when the service switch is connected to the normal feeder;

Figure 2 is a similar vertical sectional view of the same, showing the control parts in the position which they occupy when the service switch is connected to the emergency feeder;

Figure 3 is a top plan view of the same control parts with the top of the casing removed and showing only a portion of the service switch casing;

Figure 4 is a fragmentary vertical sectional view taken in the plane of line 4—4 of Figure 3;

Figure 5 is a detail sectional view of cam mechanism, taken in the plane of line 5—5 of Figure 4, the parts being shown in a position corresponding to that when the service switch is connected to the normal feeder;

Figure 6 is a similar sectional view of the cam mechanism in a position corresponding to that when the service switch is connected to the auxiliary feeder;

Figure 7 is a detail sectional view of the spring actuated drum having a stop lug which is adapted to engage stop members for releasably locking the service switch in its connection with the normal feeder and in its connection with the auxiliary feeder; and Figure 8 is a diagram of the control mechanism for the service switch.

The various novel features of the invention will be apparent from the following description and drawings, and will be particularly pointed out in the appended claims.

Referring first to the diagram in Figure 8 of the drawings, it will be noted that the movable member 10 of the service switch 9 is connected to the associated contact 11 which is connected to the normal feeder 12. The other stationary contact 13 of the service switch is connected to the emergency feeder 14 so that when the movable switch member 10 of the service switch is thrown over into engagement with contact 13, the power load, which is served through the service switch, will be supplied from the emergency feeder 14. As mentioned, heretofore the service switch has been thrown from one position to another manually with the attendant difficulties mentioned. In my present arrangement, I provide for having the service switch thrown automatically by mechanism to be referred to more specifically hereinafter. Suffice it to say at this point that when the service switch is thrown from one position to another, a switch 15 for controlling the circuit of an actuating motor 16' is simultaneously actuated through an operating rod 16 on which the movable contact 17 is mounted. As shown in Figure 8, this movable contact 17 is in engagement with two stationary contacts 18 and 19 for completing a circuit for the motor 16' from the emergency feeder 14 in the event that trouble occurs on the normal feeder. Under normal operating conditions with the service load thrown on the normal feeder, current is supplied through a step-down transformer 20 and through conductor 21, binding post 22, relay coil 23, binding post 24 and conductor 25, thereby completing the secondary circuit of the transformer 20 and energizing the relay coil 23 for holding the relay switch 26 in an open position against the tension of a spring 27, or, in other words, holding a relay switch member 26 out of engagement with its associated contact members 28 and 29. It will be appreciated that if trouble occurs on the normal feeder in a manner to interrupt service, the relay coil 23 will become de-energized and the relay switch 26 will be closed for completing a circuit from the auxiliary feeder 14 through transformer 30, conductor 31, relay switch 26, conductor 32, motor control switch contacts 19, 17 and 18, conductor 33, and the motor 16', and from the latter through conductor 34, binding post 24 and conductor 25 back to the transformer 30. The motor circuit being thus completed, the motor 16' is actuated for operation on a mechanical motor in the form of a spring 35 which throws the service switch 9 from its connection with the normal feeder 12 to its connection with the emergency feeder 14.

As the service switch 9 is thus thrown over into the emergency feeder connection, the motor control switch member 17 is thrown over into engagement with contacts 36 and 37, which contacts are not only in the motor circuit 16' but which are connected to the transformer 20 of the normal feeder 12, the relay coil 23 also being included in circuit.

It will be understood that the normal feeder at this time is out of order. Therefore, in spite of the fact that the relay switch 26 may be closed, mechanism to be mentioned hereinafter is provided for preventing the service switch 9 from being thrown back suddenly onto the normal feeder. Of course as soon as the motor control switch member 17 is thrown from its engagement with contacts 18 and 19 over to the normal feeder connection contacts 36 and 37, the circuit of the motor 16' is broken. After conditions have been rectified on the normal feeder for a certain predetermined period, the service switch 9 will be thrown back onto the normal feeder, as shown in Figure 8, and at the same time through the connecting rod 16, the motor control switch member 17 will be thrown out of engagement with contacts 36 and 37 back into engagement with contacts 18 and 19 in the emergency feeder circuit.

At this time, however, the relay coil 23 will be energized for opening the relay switch 26, or, in other words, moving the switch member 26 out of engagement with its associated contacts 28 and 29. It is seen, therefore, that normally connection is made to the normal feeder through the service switch 9 and that upon the occurrence of trouble on the normal feeder, the service switch is automatically thrown over into engagement with its associated contact 13 for connection with the emergency feeder, and that when conditions are rectified on the normal feeder, the service switch within a given time limit is automatically thrown from connection with the emergency feeder back into connection with the normal feeder.

Referring now more specifically to Figures 1, 3, 4, 5 and 7, the mechanism for throwing the service switch 9 and the switch 17 for controlling the circuit of the motor 16 will be considered. The spring 35, (see Figures 1 and 4) which comprises the mechanical motor for throwing said service switch 9 and said motor control switch 17, has one of its ends connected at 38 to a sleeve 39 of a worm gear 40 which is loosely mounted upon a shaft 41. The other end of the spring 35 is connected at 42 to a drum 43 secured to the shaft 41 by a key 44. Also keyed to the shaft 41 by the same key 44 is a crank arm 45 to which one end of a link 46 is pivotally connected, the opposite end of the link being pivotally connected to one end of a crank arm 47, the other end of which is connected to a shaft 48 to which the movable member 10 of the service switch is connected. Accordingly, when the spring 35 is permitted to act, it is seen that the movable member 10 of the service switch is automatically thrown from one position to another. As shown in Figures 1, 3, 4, 5, 7 and 8, the service switch 9 is connected to the normal feeder and the other parts of the control mechanism are in corresponding positions. As a matter of fact, the service switch 9 is locked in such position, or, in other words, the spring 35 is locked against movement from throwing the movable member 10 of the service switch from its position connecting it to the normal feeder by a projection 49 (see Figures 7 and 1) which is in engagement with a stop member 50 slidably mounted upon a rod 51 and yieldably seated upon a shock spring 52. The rod 51 is pivotally mounted at 53 and is connected by a spring 54 to a similar rod 55 likewise carrying a stop member 56 yieldably mounted upon a shock spring 57, the rod 55 being pivotally connected to a support at 58. The spring 35 will thus be held ineffective and the service switch held connected to the normal feeder until a cam 59 (see Figures 5 and 1) on a sleeve 60 of the gear 40 presses the stop member 50 out of engagement with the projection 49, whereupon the spring 35 will throw the movable member 10 of the service switch out of engagement with its associated contact 11 connected to the normal feeder, over into engagement with its associated contact 13 connected to the emergency feeder, thereby throwing the service load onto the emergency feeder. During this switch movement, the drum 43, and accordingly the projection 49, is moved through an angle of 180° in a counterclockwise direction and there arrested by the projection 49 coming into engagement with the other stop 56. The crank arm 45 likewise is moved through an angle of 180° from the position shown in Figure 1 to the position shown in Figure 2, the other parts being in corresponding positions. Through the actuation of the switch shaft 48 and projection 61, pin 62 and rod 16, the motor control switch member 17 is thrown from its position shown in Figure 8 into engagement with its contacts 36 and 37, as described hereinabove. The service load is now on the emergency feeder, there having been a disruption of service on the normal feeder.

Let it be assumed now that conditions have been temporarily rectified on the normal feeder. It is desirable that the service switch should not be thrown back immediately onto the normal feeder, for it may be that the normal feeder has not been permanently returned to normal condition. For this reason, time element means is provided for preventing the service switch 9 being thrown back onto the normal line until a certain predetermined time has elapsed. The time element means includes a relatively slow actuation of the worm gear 40, it being appreciated that the latter is actuated from the electric motor 16' through the motor shaft 63, spur gears 64 and 65, the latter being secured to a shaft 66 carrying a worm 67 meshing with a driving and worm gear 68 mounted upon one end of a shaft 69 carrying a worm 70 which meshes with and drives the worm gear 40.

At this point, referring again to the diagram in Figure 8, when the service switch member 10 is connected to the emergency feeder, the motor control switch member 17 is in engagement with switch contacts 36 and 37 for completing the circuit of the motor 16' from the normal feeder. Let it be assumed, therefore, that conditions have been rectified on the normal feeder and accordingly the motor 16' is being actuated. Through mechanical connections mentioned, the motor 16' now slowly rotates the worm gear 40 in a counterclockwise direction, as viewed in Figure 2, through an angle of substantially 156° until another cam 71 (see Figures 6 and 3) on the sleeve 60 of gear 40 and offset with respect to cam 59 and stop member 50, passes around into engagement with the stop 56 for moving it outwardly and thereby permitting the coil spring 35, which during this interim has been wound by the motor 16', to throw the service switch 10 from connection with the auxiliary feeder over into connection with the normal feeder. The time element introduced is the time which is required to rotate the gear 40 through an angle of 156°, during which time it winds up the actuating spring 35. This time element may be made as desired. It will be understood that as the service switch member 10 is thrown from engagement with emergency feeder contact 13 over into engagement with normal feeder contact 11, the motor control switch member 17 is thrown to the left for moving the motor switch member 17 out of engagement with contacts 36 and 37 and into engagement with contacts 18 and 19 through another finger 72 formed with the finger 61 mounted upon the switch shaft 48, it being understood that said finger 72 engages the pin 62 mounted upon the switch connecting rod 16.

It will be understood, of course, that the service switch is mounted within the casing 73, preferably for containing oil, making the switch useful for high tension work.

By means of the arrangement hereinabove described, all of the objects of this invention are accomplished.

I claim:

1. In a system of electrical distribution, the combination of a normal feeder, an auxiliary feeder, a service switch for selective connection to either feeder, a mechanical motor for actuating said service switch, an electric motor for storing power in said mechanical motor, and means for controlling the circuit of said motor dependent upon operating conditions on one of said feeders.

2. In a system of electrical distribution, the combination of a normal feeder, an auxiliary feeder, a service switch for selective connection to either feeder, a spring for actuating said service switch, a motor for winding said spring, a normally open relay switch having a coil normally energized from said normal feeder, means for closing said relay switch to complete the motor circuit if trouble occurs along said normal feeder, and means whereby said spring thereby actuates said service switch for disconnection from said normal feeder and for connection to said auxiliary feeder.

3. In a system of electrical distribution, the combination of a normal feeder, an auxiliary feeder, a service switch for selective connection to either feeder, a spring for actuating said service switch, a motor for winding said spring, a normally open relay switch having a coil normally energized from said normal feeder, means for closing said relay switch to complete the motor circuit if trouble occurs along said normal feeder, means whereby said spring thereby actuates said service switch for disconnection from said normal feeder and for connection to said auxiliary feeder, and means whereby said service switch is thrown back into connection with said normal feeder when trouble is removed therefrom.

4. In a system of electrical distribution, the combination of a normal feeder, an auxiliary feeder, a service switch for selective connection to either feeder, means including a motor for actuating said service switch from connection with one of said feeders to connection with another of said feeders, and a motor control switch through which the circuit of said motor is automatically completed from either of said feeders.

5. In a system of electrical distribution, the combination of a normal feeder, an auxiliary feeder, a service switch for selective connection to either feeder, means including a motor for actuating said service switch from connection with one of said feeders to connection with another of said feeders, a motor control switch through which the circuit of said motor is automatically completed from either of said feeders, and a relay switch also controlling the circuit of said motor under certain predetermined conditions.

6. In a system of electrical distribution, the combination of a normal feeder, an auxiliary feeder, a service switch for selective connection to either feeder, means including a motor for actuating said service switch from connection with one of said feeders to connection with another of said feeders, a motor control switch through which the circuit of said motor is automatically completed from either of said feeders, and a relay switch for completing the circuit of said motor when trouble occurs on said normal feeder.

7. In a system of electrical distribution, the combination of a normal feeder, an auxiliary feeder, a service switch for selective connection to either feeder, means including a motor whereby said service switch may be thrown from connection with one of said feeders to connection with another of said feeders, and a motor control switch which normally is disconnected from said normal feeder and connected to said auxiliary feeder whereby the circuit of said motor may be completed from said emergency feeder when trouble occurs on said normal feeder.

8. In a system of electrical distribution, the combination of a normal feeder, an auxiliary feeder, a service switch for selective connection to either feeder, means including a motor whereby said service switch may be thrown from connection with one of said feeders to connection with another of said feeders, and a motor control switch which normally is disconnected from said normal feeder and connected to said auxiliary feeder whereby the circuit of said motor may be completed from said emergency feeder when trouble occurs on said normal feeder, said motor switch being connected to said normal feeder when said service switch is connected to said auxiliary feeder whereby when trouble is removed from said normal feeder the circuit of said motor may be completed from said normal feeder.

9. In a system of electrical distribution, the combination of a normal feeder, an auxiliary feeder, a service switch for selective connection to either feeder, means including an electric motor for actuating said service switch from connection with one of said feeders to the other of said feeders, a motor control switch which is connected to the emergency feeder when said main switch is connected to said normal feeder, a normally open relay switch having a coil normally energized when said service switch is connected to said normal feeder, said relay switch being adapted to be closed upon the occurrence of trouble on said normal feeder for completing the circuit from said auxiliary feeder through said motor control switch for operating said motor.

10. In a system of electrical distribution, the combination of a normal feeder, an auxiliary feeder, a service switch for selective connection to either feeder, means including an electric motor for actuating said service switch from connection with one of said feeders to the other of said feeders, a motor control switch which is connected to the emergency feeder when said main switch is connected to said normal feeder, a normally open relay switch having a coil normally energized when said service switch is connected to said normal feeder, said relay switch being adapted to be closed upon the occurrence of trouble on said normal feeder for completing the circuit from said auxiliary feeder through said motor control switch for operating said motor, said motor control switch being connected to said normal feeder when said service switch is connected to the auxiliary feeder whereby when trouble is removed from said normal line, said relay switch is opened and current supplied from said normal feeder to said motor for actuating the latter.

11. In a system of electrical distribution, the combination of a normal feeder, an auxiliary feeder, a service switch for selective connection to either feeder, means for quickly throwing said service switch from connection with said normal feeder to connection with said auxiliary feeder if trouble occurs on the normal feeder, and means for preventing said service switch being thrown back into connection with said normal feeder until a certain predetermined time has elapsed.

12. In a system of electrical distribution, the combination of a normal feeder, an auxiliary feeder, a service switch for selective connection to either feeder, a spring for actuating said switch from one position to the other, a motor for storing energy in said spring, means whereby said service switch is quickly thrown from its connection with said normal feeder to a connection with said auxiliary feeder if trouble occurs along the normal feeder, and means for preventing said service switch from being thrown back into connection with said normal feeder even though conditions have been rectified on said normal feeder until a certain predetermined time has elapsed.

13. In a device of the character described, the combination of feeders, a movable connecting member for selectively connecting one of said feeders to receiving means, an operating device for actuating said connecting member, means for actuating said operating device upon failure of the connected feeder to connect another feeder and means for preventing actuation of said connecting member to disconnect said other feeder until after predetermined movement of said operating device.

Signed at Chicago, Illinois, this 10th day of March, 1927.

JOSEPH RAH.